(12) United States Patent
Maman (10) Patent No.: US 9,336,407 B2
(45) Date of Patent: May 10, 2016

(54) DYNAMIC DATA MASKING SYSTEM AND METHOD

(71) Applicant: Green SQL Ltd, Tel Aviv-Jaffa (IL)

(72) Inventor: David Maman, Tel Aviv-Jaffa (IL)

(73) Assignee: GREEN SQL LTD., Tel-Aviv (IL)

( * ) Notice: Subject to any disclaimer, the term of this patent is extended or adjusted under 35 U.S.C. 154(b) by 0 days.

(21) Appl. No.: 14/380,036

(22) PCT Filed: Feb. 20, 2013

(86) PCT No.: PCT/IL2013/050154
§ 371 (c)(1),
(2) Date: Aug. 20, 2014

(87) PCT Pub. No.: WO2013/136324
PCT Pub. Date: Sep. 19, 2013

(65) Prior Publication Data
US 2015/0067886 A1  Mar. 5, 2015

Related U.S. Application Data (60) Provisional application No. 61/601,050, filed on Feb. 21, 2012.

(51) Int. Cl.
G06F 21/00 (2013.01)
G06F 21/62 (2013.01)
G06F 17/30 (2006.01)

(52) U.S. Cl.
CPC ...... G06F 21/6218 (2013.01); G06F 17/30386 (2013.01); G06F 21/6227 (2013.01)

(58) Field of Classification Search
USPC .......................................................... 726/27
See application file for complete search history.

(56) References Cited

U.S. PATENT DOCUMENTS

2004/0139043 A1   7/2004  Lei et al.
2008/0086482 A1*  4/2008  Weissman ........................ 707/10
2009/0100527 A1*  4/2009  Booth et al. .................... 726/27

OTHER PUBLICATIONS

International Search Report for related PCT/IL2013/050154 mailed Jun. 17, 2013.
International Preliminary Report on Patentability for related PCT/IL2013/050154 mailed Aug. 26, 2014.

* cited by examiner

*Primary Examiner* — Jason Lee
(74) *Attorney, Agent, or Firm* — Graeser Associates International Inc; D'Vorah Graeser (57) ABSTRACT

A system and method for providing dynamic data masking for databases through a data masking apparatus.

4 Claims, 5 Drawing Sheets

DYNAMIC DATA MASKING SYSTEM AND METHOD

FIELD OF THE INVENTION

The present invention is of a system and method for a database masking and in particular, such a system and method for dynamically masking data accessed through a stored procedure.

BACKGROUND OF THE INVENTION

Relational databases, and their corresponding management systems, are very popular for storage and access of data. Relational databases are organized into tables which consist of rows and columns of data. The rows are formally called tuples. A database will typically have many tables and each table will typically have multiple tuples and multiple columns. The tables are typically stored on direct access storage devices (DASD) such as magnetic or optical disk drives for semi-permanent storage.

Typically, such databases are accessible through queries in SQL, Structured Query Language, which is a standard language for interactions with such relational databases. An SQL query is received by the management software for the relational database and is then used to look up information in the database tables.

Certain types of data, such as sensitive financial information or data that may have privacy related issues, should be masked at the time of retrieval from the database. Typically, it is preferred that the uncorrupted and unmasked data be stored on the database, as certain applications may need to access the unmasked data, while other applications should only have access to masked data.

For simple data retrieval functions, it is possible to mask the data based upon the presence of a sensitive field in the query at the time that the query is transmitted, indicating sensitive data that should be masked. In other words, the query is sent to the database and then analyzed; upon determining that at least one field should contain masked data, it is possible to substitute the masked data for the actual data that the query would normally return, such that the results of the query feature masked data and not sensitive data. This substitution is possible by storing a function at the database which performs the analysis and substitution "on the fly" at the time of responding to the query.

For complex stored procedures, which are stored at the database and which feature multiple functions, it can be very difficult to detect and correctly handle such fields at the time of responding to the query, which may be buried deep within the stored procedure. On the other hand, stored procedures save query transmission bandwidth and prevent repetitive query transmission, while also permitting greater security and control over queries, so they are generally quite useful, except for the problem of sensitive data. Thus, for such stored procedures, a different method is required, which preserves the utility of stored procedures while also protecting sensitive data.

SUMMARY OF THE INVENTION

The background art does not teach or suggest a system or method for providing dynamic data masking for complex stored procedures. The background art does not teach or suggest such a system or method which also permits the original data and/or stored procedure to be maintained at the database in an uncorrupted format.

The present invention overcomes the deficiencies of the background art by providing a system and method, in at least some embodiments, for masking sensitive data accessed or retrieved by stored procedures through dynamic data masking, which optionally also permits the original data and/or stored procedure to be maintained at the database in an uncorrupted format. By "dynamic data masking" it is meant that sensitive data is masked on the fly, without changing the actual data as stored in the database. As used herein, the term "data masking" refers to dynamic data masking.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention provides a system and method, in at least some embodiments, for a data masking server that permits sensitive data to be masked even for complex stored procedures through dynamic data masking.

Figure 1A:
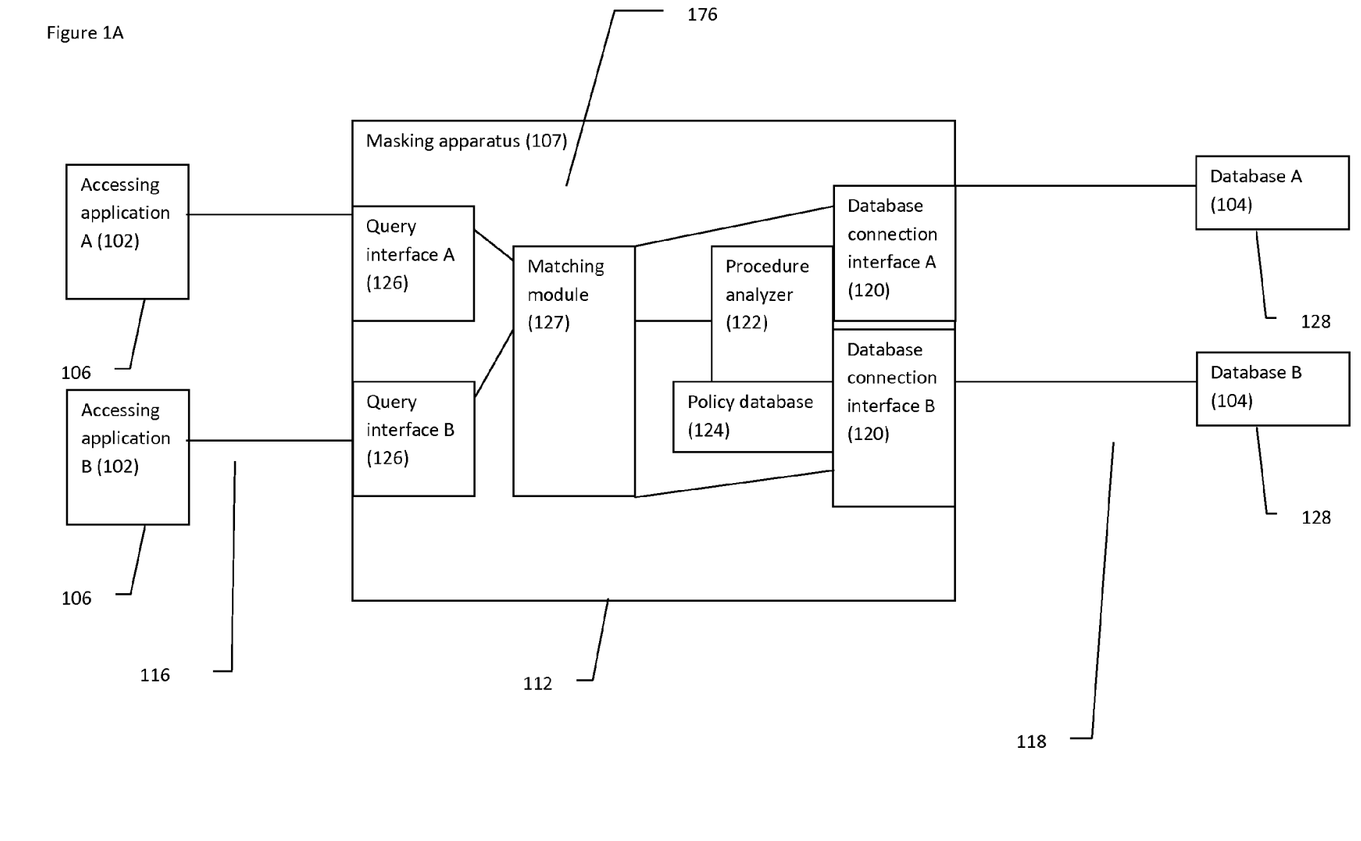
FIGS. 1A-1B show exemplary, illustrative non-limiting systems for a data masking server, including a basic system (FIG. 1A) and a more detailed system (FIG. 1B), in which the data masking server is separate from the database, according to some embodiments of the present invention.
Figure 1B:
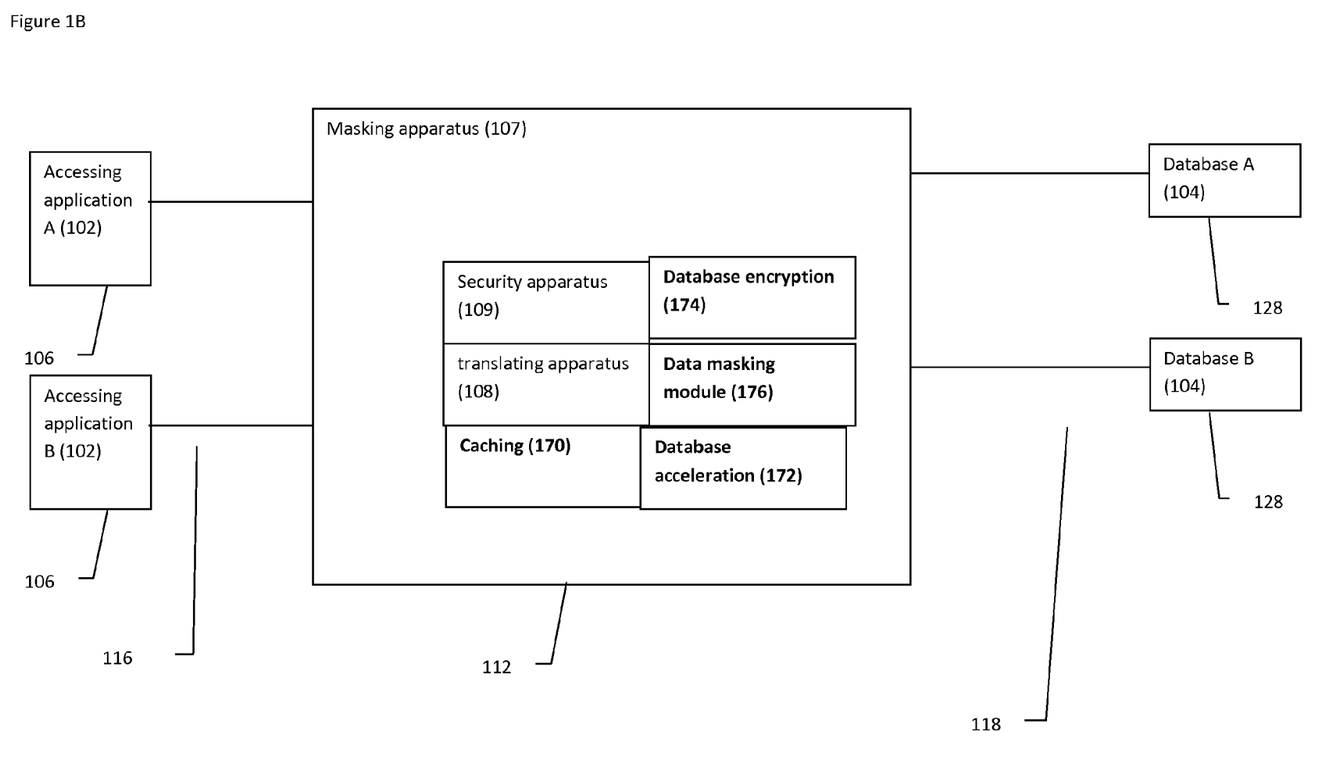

Referring now to the drawings, FIGS. 1A-1B show exemplary, illustrative non-limiting systems for a data masking server that is separate from the database, according to some embodiments of the present invention for providing dynamic data masking. As shown in FIG. 1A, a system 100 features a plurality of accessing applications 102 for providing a software application interface to access one or more of a plurality of databases 104. Two accessing applications 102, A and B, are shown; as are two databases 104, A and B, for the purpose of illustration only and without any intention of being limiting.

Accessing application 102 may optionally be any type of software, or many optionally form a part of any type of software, for example and without limitation, a user interface, a back-up system, web applications, data accessing solutions, data warehouse solutions, CRM (customer relationship management) software and ERP (enterprise resource planning) software. Accessing application 102 is a software application (or applications) that is operated by some type of computational hardware, shown as a computer 106. However, optionally computer 106 is in fact a plurality of separate computational devices or computers, any type of distributed computing platform and the like; nonetheless, a single computer is shown for the sake of clarity only and without any intention of being limiting.

Similarly, database 104 is a database software application (or applications) that is operated by some type of computational hardware, shown as a computer 128. Again, optionally computer 128 is in fact a plurality of separate computational devices or computers, any type of distributed computing platform and the like; nonetheless, a single computer is shown for the sake of clarity only and without any intention of being limiting.

Masking apparatus 107 preferably comprises a data masking module 176 as shown. Data masking module 176 queries each database 104 A and B for any stored procedures, optionally through a database connection interface A and B 120 as shown. Each database connection interface 120 is optionally specific for a particular type of database software 104, for example; optionally only a single such database connection interface 120 may be implemented (not shown). Database connection interface 120 is preferably able to communicate with each database 104, to retrieve any stored procedures.

Next data masking module 176 analyzes the retrieved stored procedures, preferably according to some type of policy, to detect any sensitive fields within the stored procedures. Optionally and preferably, the analysis is performed by a procedure analyzer 122, in conjunction with a policy as stored in a policy database 124. An administrator may optionally set one or more polices within policy database 124, to determine which fields (or type of fields or type of information) should be considered to be sensitive, including but not limited to credit card numbers, social security numbers, phone numbers, e-mail addresses, and so forth.

As the stored procedure may be quite complex, with many different functions (and even including thousands of requests), procedure analyzer 122 preferably analyzes each stored procedure by decomposing the stored procedure to detect each field. Procedure analyzer 122 then preferably determines a category for each field, such as for example "sensitive" or "sensitive according to one or more other parameters", "not sensitive" and so forth. In case a field involves some type of variable that is dependent upon a prior result, procedure analyzer 122 preferably considers all possibilities and if necessary, places the field in a "potentially sensitive" category so as to perform further analysis if necessary at run time. Detection of data and policy determines where sensitive information is located and procedure analyzer 122 determines how each procedure retrieves information from the sensitive columns.

For each field that is considered to be sensitive or potentially sensitive, procedure analyzer 122 preferably performs data masking as is known in the art, for example to optionally prevent complete and open (unmasked) transmission of certain fields of data (whether completely or partially, for example to allow the last four digits only of a credit card number to be transmitted). Also optionally, procedure analyzer 122 may insert a new function which considers multiple fields and determines whether to block all or part of each field, depending upon a coordinated review of the results of the stored procedure. In each case, procedure analyzer 122 preferably changes the stored procedure in some manner, so as to permit data masking to occur.

According to at least some embodiments, procedure analyzer 122 then stores the new procedure under a new name at the respective database 104 from which the procedure was retrieved. For these embodiments, data masking module 176 preferably features a matching module 127 for storing both the old name and the new name. When accessing application A or B 102 sends a request for the stored procedure under the old name, matching module 127 intercepts the request and substitutes the new name for the stored procedure. Matching module 127 then passes the request to the respective database connection interface 120, which then passes the request to the respective database 104 for execution.

The results may then optionally be passed back directly to accessing application A or B 102 (not shown) or alternatively may pass through a query interface 126 A or B as shown. Query interface 126 may optionally be adapted for each accessing application 102; alternatively a single query interface 126 may optionally be provided (not shown). Also optionally, matching module 127 may be implemented within query interface 126 (not shown).

According to at least some alternative embodiments, procedure analyzer 122 then stores the new procedure under the old name at the respective database 104 from which the procedure was retrieved, thereby effective removing the old procedure (optionally, the old procedure could be stored under a new name). For these embodiments, data masking module 176 may optionally not feature matching module 127, but may optionally feature query interface 126 as previously described.

In any case, database connection interface 120 and procedure analyzer 122 optionally and preferably rely upon commands for retrieving, viewing, and editing such stored procedures as is known in the art, according to the type of database 104. One of ordinary skill in the art could easily implement such commands as necessary.

FIG. 1B shows an optional embodiment of the system of FIG. 1A, showing an optional detailed embodiment of data masking apparatus 107. In this optional detailed embodiment, data masking module 176 is shown as a single block and data masking apparatus 107 optionally comprises a plurality of additional functional blocks as shown.

In a typical prior art system, accessing application 102 would communicate directly with database 104, and would therefore need to be able communicate in the query language and according to the query protocol for database 104. However, in this illustrative embodiment of the present invention, accessing application 102 communicates with database 104 through a translating apparatus 108, shown as part of a data masking apparatus 107. As described in greater detail below, translating apparatus 108 preferably receives database queries from accessing application 102, which would otherwise have been sent directly to database 104. Translating apparatus 108 therefore preferably acts as a forwarding solution for database 104.

Translating apparatus 108 is shown as being operated by a computer 112, but in fact could optionally be implemented as software (by computer 112 for example), hardware, firmware or a combination thereof. Again, if present, optionally computer 112 is in fact a plurality of separate computational devices or computers, any type of distributed computing platform and the like; nonetheless, a single computer is shown for the sake of clarity only and without any intention of being limiting.

In order to provide security for databases 104, data masking apparatus 107 also features a security apparatus 109. Security apparatus 109, as shown in greater detail below, preferably screens all received queries and data from portions of system 100 that are external to databases 104, including for example accessing applications 102 A and B. Although security apparatus 109 and translating apparatus 108 are shown as separate components, in fact preferably both security apparatus 109 and translating apparatus 108 interact through a plurality of different modules and interactions for providing both security and translation functionalities for system 100, as shown in greater detail below.

Data masking apparatus 107 also optionally comprises a caching module 170, for at least temporarily storing requests and responses for example, or any other data or information which could improve the performance of system 100. Caching 170 may optionally be used alone or in combination with a database acceleration module 172 for further improving the performance of system 100. According to at least some embodiments, caching 170 improves the performance of system 100 as caching reduces the required computational power of the hardware (such as computer 112) supporting database 204. For example, each time dynamic masking is performed on a query related to a stored procedure as described herein, without caching, database 204 needs to perform the entire masking procedure. With caching, database 204 is able to rely, partially or completely, on stored information, thereby reducing the amount of computations required to return an answer to the query.

Also optionally one or more databases 104 may be encrypted, such that queries to and responses from such an encrypted database 104 are also encrypted, through a database encryption module 174.

For both embodiments of FIGS. 1A and 1B, data masking apparatus 107, accessing application 102 and database 104 preferably communicate through some type of computer network, although optionally different networks may communicate between accessing application 102 and data masking apparatus 107 (as shown, a computer network 116), and between data masking apparatus 107 and database 104 (as shown, a computer network 118). For example, computer network 116 may optionally be the Internet, while computer network 118 may optionally comprise a local area network, although of course both networks 116 and 118 could be identical and/or could be implemented according to any type of computer network.

In this embodiment of the system 100 according to the present invention, data masking apparatus 107 preferably is addressable through both computer networks 116 and 118; for example, data masking apparatus 107 could optionally feature an IP address for being addressable through either computer network 116 and/or 118.

Database 104 may optionally be implemented according to any type of database system or protocol; however, according to preferred embodiments of the present invention, database 104 is implemented as a relational database with a relational database management system. Non-limiting examples of different types of databases include SQL based databases, including but not limited to MySQL, Microsoft SQL, Oracle SQL, PostgreSQL, and so forth.

Optionally and preferably, system 100 may comprise a plurality of different databases 104 operating according to different database protocols and/or query languages and/or even having different structures. However, system 100 is also useful for a single database 104 (or multiple databases 104 of a single type, having a common database protocol, structure and/or query language), in that system 100 permits complete flexibility with regard to accessing application 102 and database 104; these two components do not need to be able to communicate with each other directly. As previously described, this lack of a requirement for direct communication may optionally be useful, for example, for legacy systems, or indeed for any system in which it is desirable to remove this requirement. Furthermore, this lack of a requirement may optionally be useful for organizations which have knowledge and skills with regard to particular types of database protocols, languages and/or software, but which may lack knowledge with regard to one or more other types.

These embodiments with regard to different database types and non-limiting examples of advantages may also optionally be applied to any of the embodiments of the system according to the present invention as described herein.

Figure 2A:
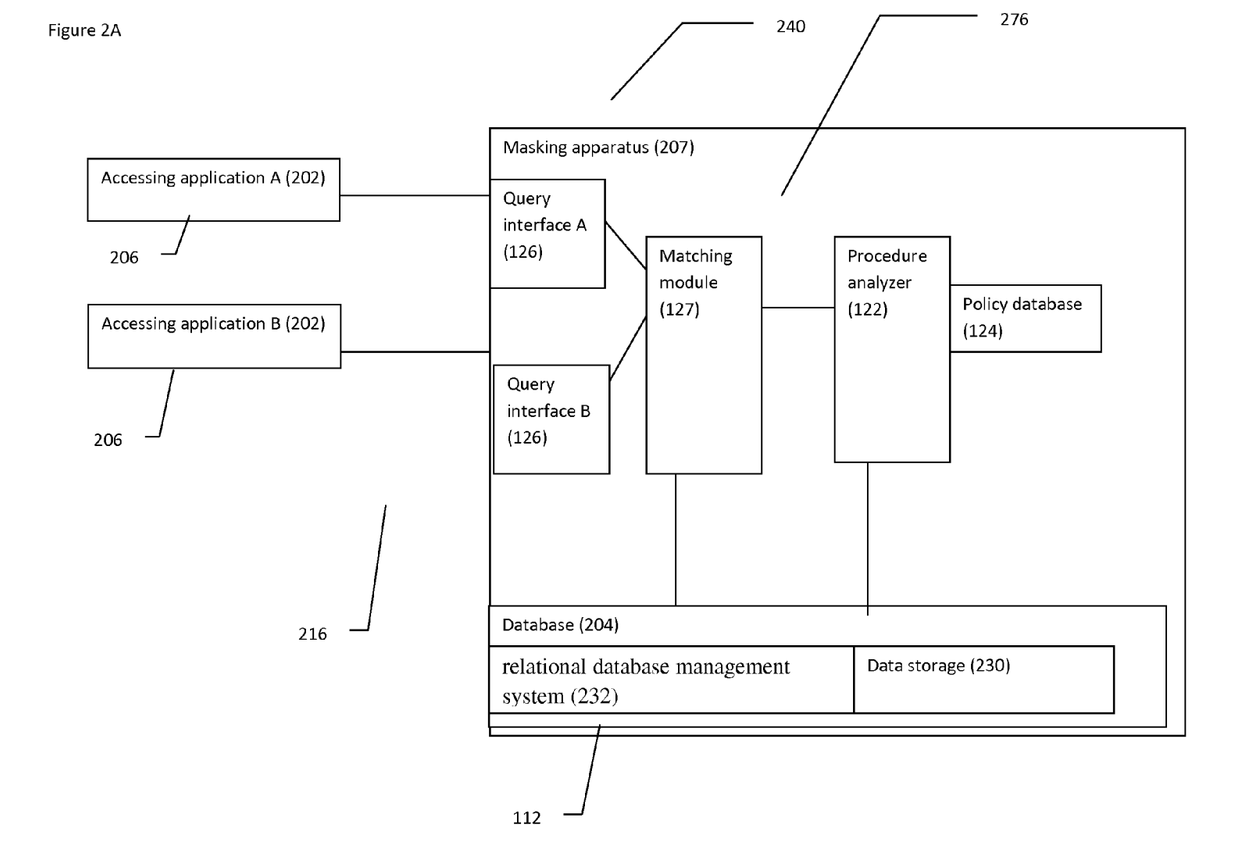
FIGS. 2A-2B show alternative, illustrative exemplary systems according to at least some embodiments of the present invention, in which the data masking server is incorporated within the database.
Figure 2B:
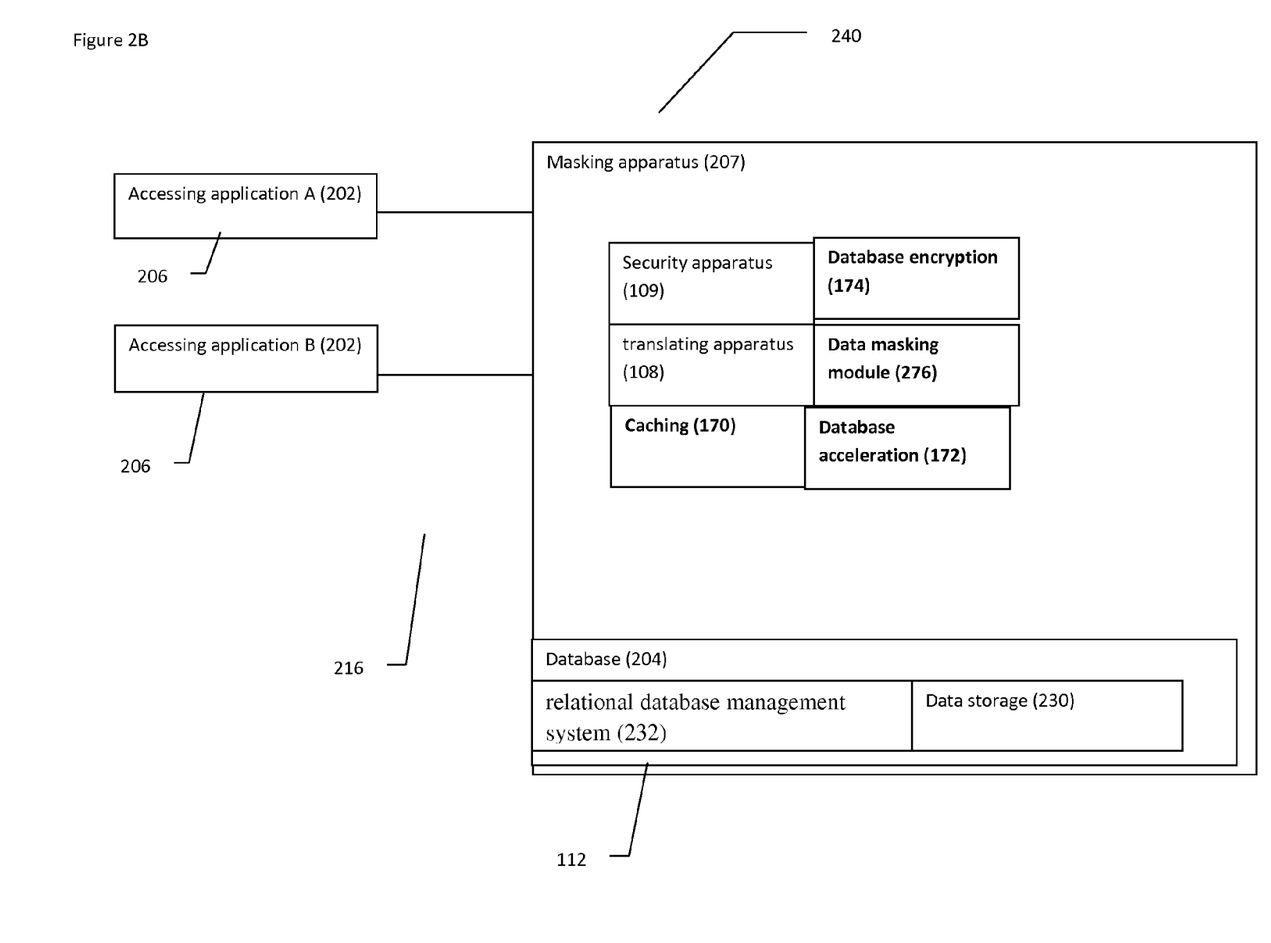

FIG. 2A-B show alternative, illustrative exemplary systems according to at least some embodiments of the present invention, in which the data masking apparatus is incorporated within the database, such that the data masking apparatus is operated by the same hardware as the database; the hardware may optionally be a single hardware entity or a plurality of such entities. For this exemplary system, the database is shown as a relational database with a relational database management system for the purpose of illustration only and without any intention of being limiting. Components with the same or similar function are shown with the same reference number plus 100 as for FIGS. 1A-B.

The operation of masking apparatus 207 is similar for FIGS. 2A-B, except that for those embodiments, masking apparatus 207 is operated by the same hardware that operates the database, as described in greater detail below.

As shown with regard to FIG. 2A, system 200 again features a plurality of accessing applications 202, of which two are shown, accessing applications 202 A and B, but in this case these accessing applications 202 are addressing a single database 204. Database 204 is preferably implemented as a relational database, with a data storage 230 having a relational structure and a relational database management system 232. Accessing application 202 addresses database 204 according to a particular port; however, as database 204 is operated by a server 240 as shown, accessing application 202 sends the query to the network address of server 240.

Unlike for the system of FIG. 1A, masking apparatus 207 is preferably running over the same hardware as database 204, optionally by single server 240 as shown or alternatively through distributed computing, rather than being implemented as a separate apparatus.

FIG. 2B shows the simplified data masking module structure 276 as for FIG. 1B. Translator 140 again translates the queries and the respective results, as previously described. The operation is preferably substantially similar to that of the translating apparatus of FIG. 1B.

Data masking apparatus 207 and accessing application 202 preferably communicate through a computer network 218, which may optionally be implemented according to any type of computer network as described above. Also as noted above, accessing application 202 sends the query for database 204 to the network address of server 240. The query is sent to a particular port; this port may optionally be the regular or "normal" port for database 204. Otherwise, accessing application 202 may optionally send the query to a different port for data masking apparatus 207, so that data masking apparatus 207 communicates with database 204 through a different port.

Preferably, data masking apparatus 207 receives queries through a particular port for each database type. By "database type" it is meant a particular combination of database structure, protocol and query language; databases of the same database type can communicate freely without translation. For example, one database type could optionally be a relational database operated by MySQL, while another database type could optionally be a relational database operated by MS (Microsoft) SQL. Queries for each such type are preferably received through a different port, which accessing application 202 is more preferably configured to access. Optionally there could be a generic port for any non pre-configured database types.

Figure 3:
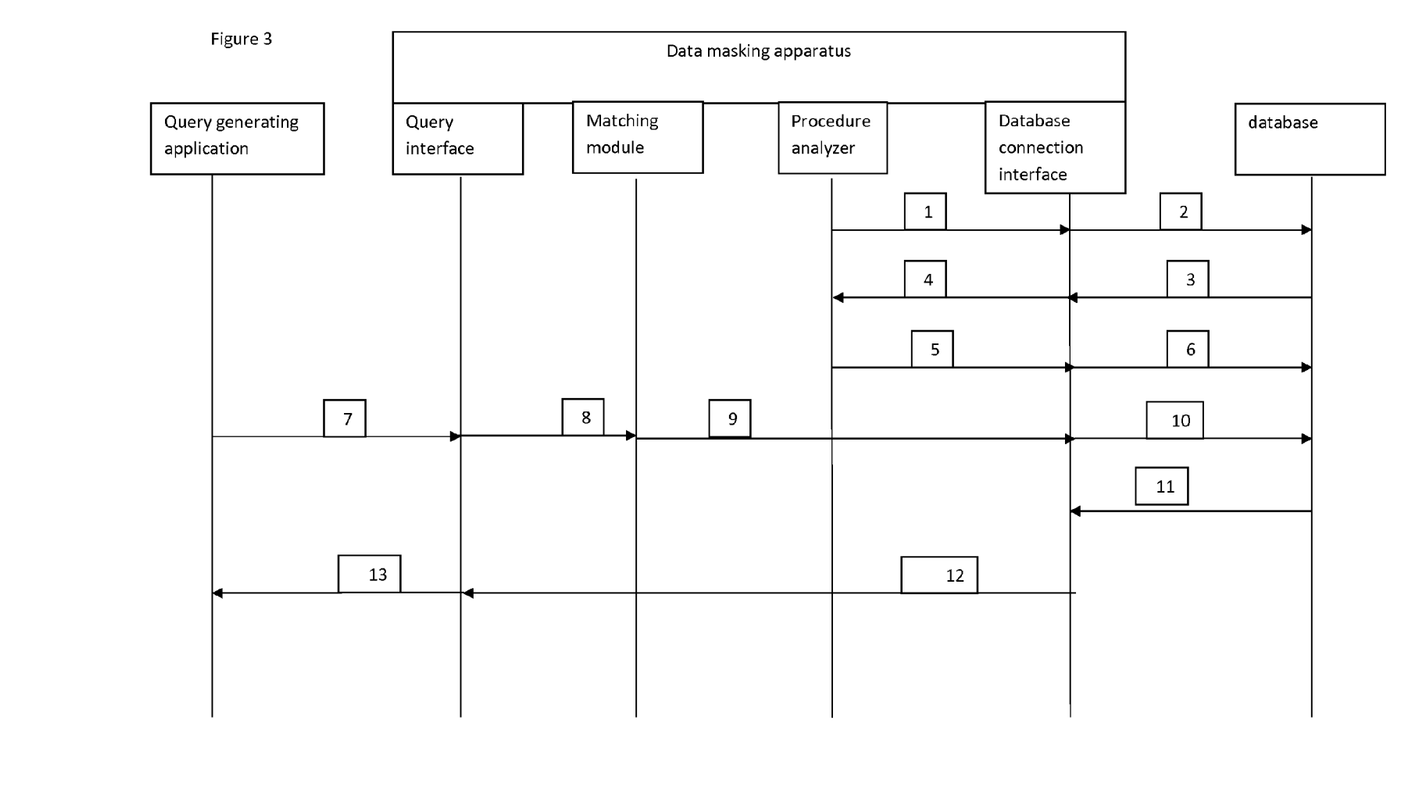
FIG. 3 is a flow diagram of an exemplary, illustrative method for operation of a data masking server according to at least some embodiments of the present invention.

FIG. 3 is a flowchart of an exemplary, illustrative method for operation of a data masking apparatus according to at least some embodiments of the present invention, with interactions between the accessing application, data masking apparatus, and the database. Arrows show the direction of interactions. It is assumed, before the method starts, that a policy (or policies) has been set to determine when and how dynamic masking should occur. For example, the customer/user/administrator needs to determine which type of data and data locations are to be masked, and which masking behavior should be applied. For example, a data column which includes credit card information may optionally be masked such that only the last four digits are shown, but preferably social security numbers are fully masked, as a non-limiting example of a policy. Also preferably the policy determines whether the altered stored procedure is saved under a new name or the old name as previously described.

As shown, in stage 1, the procedure analyzer sends a request to the database connection interface for obtaining one or more stored procedures. In stage 2, the database connection interface sends the request to the database. In stage 3, the database returns the stored procedure to the database connection interface, which then sends it to the procedure analyzer in stage 4. The procedure analyzer preferably analyzes the stored procedure according to a policy as described above and performs dynamic data masking on it. The new stored procedure is then returned to the database connection interface in stage 5 and hence to the database in stage 6.

In stage 7, a query involving a stored procedure is transmitted from some type of query generating application, shown as the accessing application as a non-limiting example only, and is sent to the data masking apparatus, preferably to a particular query interface, according to the specific query generating application. As described above, the query generating application may optionally be any type of application, such as for example the accessing application of FIG. 1 or 2.

In stage 8, the query interface optionally and preferably passes the request for the stored procedure to the matching module. In stage 9, the matching module optionally and preferably determines the correct name for the stored procedure and sends a request for the stored procedure according to the correct name to the database connection interface. In stage 10, the database connection interface sends the request to the database.

In stage 11, the database executes the stored procedure (with dynamic data masking as previously describes) and returns the results to the database connection interface. In stage 12, the results are then sent to the query interface, which passes them back to the query generating application in stage 13.

The below relates to a non-limiting example of analysis of a stored procedure as written, retrieved, edited and stored according to Microsoft SQL.

BEFORE (a query sent by the application to view credit card numbers):
SELECT CardNumber
FROM Sales.CreditCard In the "before" example, the above query would result in the actual credit card number being sent, which is clearly undesirable.

AFTER (a query which is sent to the database through the system of the present invention, including a masking function which masks the last 4 digits):
SELECT CASE WHEN len(CardNumber)>=4 THEN
replace(CardNumber,substring(convert(varchar(max),CardNumber),1,len(CardNumber)−4),replicate('X', len(CardNumber)−4)) ELSE CardNumber END CardNumber from Sales.CreditCard In the "after" example, the query results in only the last four digits being sent, which is clearly a much more desirable result.

While the invention has been described with respect to a limited number of embodiments, it will be appreciated that many variations, modifications and other applications of the invention may be made.

What is claimed is:

1. A method for providing data masking in a system having a database operated by computational hardware and an accessing application operated by a computer, the method comprising:
    providing a data masking apparatus comprising a procedure analyzer for handling requests between the accessing applications and the databases, wherein said apparatus is operated by a computer;
    retrieving at least one stored procedure from said database by said apparatus prior to receiving a request from an accessing application;
    analyzing said stored procedure by said procedure analyzer to determine whether a sensitive field is present; wherein said analyzing for said stored procedure comprises:
    decomposing said stored procedure to detect each field; and determining a sensitiveness category for each field; wherein for a field involving a variable that is dependent upon a prior result, categorizing said dependent field by said analyzer as potentially sensitive, and further analyzing said potentially sensitive field by said procedure analyzer at run time;

wherein when said sensitive field is present, changing said stored procedure by said procedure analyzer to mask said sensitive field according to dynamic data masking;

storing said changed stored procedure in said database by said procedure analyzer; and by said apparatus, receiving the request for the stored procedure from said accessing application; executing said changed stored procedure at said database; and providing a result of said executing to said accessing application.

2. The method of claim 1, wherein said database comprises a plurality of databases and said accessing application comprises a plurality of accessing applications, said data masking apparatus further comprising a plurality of query interfaces for communicating with said accessing applications and a plurality of database connection interfaces for communicating with said databases, such that said retrieving is performed through said database connection interface and said providing said result is performed through said query interface.

3. The method of claim 2, wherein said stored procedure has a previous name, such that said storing said changed procedure in said database comprises storing said changed procedure under a new name, while maintaining said stored procedure under said previous name.

4. The method of claim 2, wherein said stored procedure has a previous name, such that said storing said changed procedure in said database comprises storing said changed procedure under said previous name.

* * * * *